United States Patent
Sylvester et al.

(10) Patent No.: US 7,087,665 B2
(45) Date of Patent: Aug. 8, 2006

(54) QUICK-SETTING CATIONIC AQUEOUS EMULSIONS USING PRE-TREATED RUBBER MODIFIED ASPHALT CEMENT

(75) Inventors: Laurence M. Sylvester, Tiburon, CA (US); Jimmy Lee Stevens, Riverside, CA (US)

(73) Assignee: RAM Technologies, Inc., Reno, NV (US)

( * ) Notice: Subject to any disclaimer, the term of this patent is extended or adjusted under 35 U.S.C. 154(b) by 235 days.

(21) Appl. No.: 10/652,725

(22) Filed: Aug. 29, 2003

(65) Prior Publication Data

US 2005/0038141 A1 Feb. 17, 2005

Related U.S. Application Data

(60) Provisional application No. 60/406,760, filed on Aug. 29, 2002.

(51) Int. Cl.
*C08L 95/00* (2006.01)
(52) U.S. Cl. ............................. 524/61; 524/60
(58) Field of Classification Search ............. 524/60–61
See application file for complete search history.

(56) References Cited

U.S. PATENT DOCUMENTS

| | | |
|---|---|---|
| 3,919,148 A | 11/1975 | Winters et al. |
| 4,018,730 A | 4/1977 | McDonald |
| 4,085,078 A | 4/1978 | McDonald |
| 4,430,464 A | 2/1984 | Oliver |
| 4,485,201 A | 11/1984 | Davis |
| 4,588,634 A | 5/1986 | Pagen et al. |
| 4,609,696 A | 9/1986 | Wilkes |
| 5,270,361 A | 12/1993 | Doung et al. |
| 5,334,641 A | 8/1994 | Rouse |
| 5,492,561 A | 2/1996 | Flanigan |
| 5,539,029 A | 7/1996 | Burris |
| 5,811,477 A | 9/1998 | Burris et al. |
| 6,156,828 A | 12/2000 | Wickett |
| 6,894,092 B1 * | 5/2005 | Sylvester ............ 524/59 |

\* cited by examiner

*Primary Examiner*—Peter Szekely
(74) *Attorney, Agent, or Firm*—Robert D. Buyan; Stout, Uxa, Buyan & Mullins, LLP

(57) ABSTRACT

Cationic aqueous emulsions of rubber modified asphalt cement (RMAC) useable for paving, seal coat, slurry seal, roofing, coating and other applications. First, a RMAC is prepared by combining 45 to 90% by weight asphalt with about 5% to about 55% by weight solid recycled rubber (e.g., crumb rubber from used vehicle tires) under conditions that cause at least a substantial portion of the solid rubber to become liquified or otherwise incorporated into the asphalt. The RMAC may be treated with dodecyl benzenesulfonic acid (DDBSA) which causes reaction(s) to occur and results in a lowering of the viscosity of the RMAC. The RMAC (or DDBSA-treated RMAC) may then be emulsified in an aqueous medium to provide an aqueous emulsion.

20 Claims, No Drawings

QUICK-SETTING CATIONIC AQUEOUS EMULSIONS USING PRE-TREATED RUBBER MODIFIED ASPHALT CEMENT

RELATED APPLICATIONS

This application claims the benefit of the United States Provisional Application Ser. No. 60/406,760 filed Aug. 29, 2002. The entire disclosure of this provisional application is expressly incorporated herein by reference.

FIELD OF THE INVENTION

This invention relates generally to asphalt emulsions useful in paving, roofing, coating and other applications, as well as methods for making such asphalt emulsions and products containing such asphalt emulsions.

BACKGROUND OF THE INVENTION

A. Crumb Rubber Modified Asphalts

Crumb rubber obtained from recycled vehicle tires has been mixed with asphalt for various applications for at least 30 years to form various compositions generally referred to as "rubber modified asphalt" or "rubber asphalt cement." In most of the previously known rubber modified asphalts or rubber asphalt cements, the crumb rubber remains in the form of solid particles after it has been combined with asphalt. In general, two (2) types of processes have been used to manufacture rubber modified asphalt or rubber asphalt cement for paving applications, namely the Wet Process and the Dry Process.

In the Wet Process particles of crumb rubber are mixed with asphalt cement to form a crumb rubber/asphalt mixture wherein aromatic oils from the asphalt are absorbed into polymer chains of the rubber, thereby causing swelling of the rubber particles. This crumb rubber/asphalt mixture is then combined with aggregate (e.g., pulverized rock, stones or sand) and sometimes other components (e.g., slag, glass, recycled asphalt, etc.) to form a paving composition. The Wet Process typically requires special equipment for blending the crumb rubber and the asphalt to form the crumb rubber/asphalt mixture.

In the Dry Process, the crumb rubber is combined with aggregate (and sometimes other dry components of the paving composition to form a crumb rubber/aggregate dry mixture. Such crumb rubber/aggregate dry mixture is subsequently combined with asphalt to form the desired paving composition.

There have also been attempts to digest, devulcanize, liquefy or chemically modify the crumb rubber prior to or during blending with asphalt to provide a more homogenous, substantially liquid, rubber modified asphalt. These processes include a technique known as the "Terminal Blend Process" wherein crumb rubber is digested into the asphalt at a refinery. The Terminal Blend Process has been used in Texas since about 1995 and is generally understood to be incapable of incorporating as much crumb rubber into the asphalt as the Wet Process or the Dry process.

Various United States patents have described methods for combining digested, devulcanized, liquefied or chemically modified crumb rubber prior to or during its mixture with asphalt, to form variations of rubber modified asphalt or rubber asphalt cement. For example, U.S. Pat. No. 5,270,361 (Duong et. al.) describes a process for making an asphalt composition which includes synthetic or natural rubber particles of up to one-half inch in thickness. Elemental selenium or an organo-selenium compound is added into the mixture to act as a substitute for the sulfur which is removed during the vulcanization process. The selenium or organo-selenium compound acts as a cross-linking agent. The composition is treated with pressurized air in a dehydrogenation reaction. In the dehydrogenation vessel, the dispersing device includes a pair of discs turning at 3600 rpm which promotes homogenization and acceleration of the dehydrogenation reaction. Elemental selenium or an organo-selenium compound is added into the homogenized composition and mixed in a static mixer. The asphalt composition is then recovered and stored in a container at about 150.degree. to 175.degree. C.

U.S. Pat. No. 4,609,696 (Wilkes) describes a rubberized asphalt composition wherein asphalt is combined with a hydrocarbon oil to provide a homogenized asphalt-oil mixture. Such asphalt-oil mixture is then combined with solvent-dispersed particulate rubber to provide a homogenous gel. This gel may then be emulsified by passing the asphalt-rubber-oil gel, with water, through a colloid mill.

Also, U.S. Pat. No. 4,430,464 (Oliver) describes a pavement binder composition in which rubber particles are digested in a bituminous material.

U.S. Pat. No. 4,588,634 (Pagen et al.) describes a roofing material using bitumen and ground tire rubber together with mineral stabilizer and an elastomeric polymer composition.

U.S. Pat. No. 5,334,641 (Rouse) describes a rubber modified asphalt for use as a paving compound which is formed by reacting ground rubber, of 50 mesh or finer, with paving grade asphalt and mixing the combination at 300.degree.–400.degree. F. The mixture reacts fully within 25 minutes or less to form a freely pouring mixture and can be held at normal asphalt working temperatures for at least 96 hours without degradation.

U.S. Pat. No. 4,485,201 (Davis) describes a method of modifying asphalt with a mixture of ground rubber and synthetic rubber. The compositions include oils and antioxidants in addition to asphalt and rubber. The processing takes place below 375.degree. F.

U.S. Pat. No. 4,085,078 (McDonald) describes a paving material formed by heating a mixture of paving grade asphalt and a non-oil resistant rubber to a temperature of about 360° F.–500° F. The asphalt rubber mixture is diluted with a diluent prior to reaction to form a gelled reaction product. McDonald, U.S. Pat. No. 4,069,182, also describes a hot gelled composition which can be applied to cracked or distressed pavements to repair such pavements. McDonald, U.S. Pat. No. 3,891,585, describes a similar hot gelled composition for repairing pavements.

U.S. Pat. No. 4,018,730 (McDonald) describes thixotropic emulsions prepared from rubber modified asphalt gel. The rubber modified asphalt gel is prepared by processing 20–50% particulate rubber with asphalt at temperatures above 350° F. The emulsion is then created by admixing an asphalt-soap to the rubber modified asphalt gel, thereby forming a thixotropic emulsion.

U.S. Pat. No. 3,919,148 (Winters et al.) describes an elastomeric paving material prepared from asphalt, rubber and an asphalt solvent to form a hot, thick, viscous, gelled composition.

U.S. Pat. No. 5,492,561 (Flanigan) describes a process for liquefying tire rubber known as the TRMACS process. In the TRMACS process, crumb rubber and the asphalt are heated to temperatures of approximately 500° F. under carefully controlled conditions. As a result, the crumb rubber becomes liquified, hydrogen sulfides and mercaptans evolve and the large insoluble polymer molecules of the rubber break into smaller thermoplastic molecules. These thermoplastic molecules are then adsorbed onto the maltenes or other components of the asphalt, providing a homogenous modified asphalt composition in which the rubber has been fully incorporated.

The entire disclosures of each of the above-mentioned United States patents are expressly incorporated herein by reference.

B. Asphalt Emulsions:

For many applications, asphalt is combined with water and a small amount of a surface active agent known as an emulsifier. Such mixture is then run through a device known as a colloid mill which shears the asphalt into tiny droplets. Due to the presence of the emulsifier, the tiny asphalt droplets remain dispersed throughout the water in a stable suspension known as an aqueous asphalt emulsion.

Asphalt emulsions are classified into three categories; anionic, cationic, or nonionic. The anionic and cationic classes refer to the electrical charges surrounding the asphalt particles. Asphalt emulsions have been used in a variety or products including driveway sealers, roofing repair materials, caulks, mastics, crack fillers and in paving materials such as seal coats, chip seals and slurry seals. In some instances, a polymer latex such as styrene-butadiene-rubber latex (SBR latex) is added to the aqueous asphalt emulsion to provide a "polymer modified" asphalt emulsion. Such polymer modified asphalt emulsions are desirable in certain applications such as slurry seal paving applications where it is desired for the asphalt emulsion to have improved physical properties such as better adhesion to particles of aggregate and/or to an underlying surface, better water resistance, better thermal stability, higher softening temperature, etc.

Asphalt Emulsion Slurry Seals are typically used for sealing and repairing roads, drive ways, parking lots and other black topped surfaces. Generally speaking, slurry seals are produced by combining an aqueous asphalt emulsion mixture (e.g., asphalt, water, emulsifier(s) and sometimes other additives (e.g., polymer modifiers, thickeners, surfactants, fillers) with aggregate (e.g., stones or sand) to form a slurry. This slurry is then dispensed onto a paved surface to form a new top layer or coating on the paved surface. In many applications, the aqueous asphalt emulsion mixture is pumped into a mixing apparatus known as a "pug mill" that is mounted on a slurry mixing truck. The aggregate is dispensed into the pug mill where it becomes combined with the liquid asphalt emulsion mixture to produce a slurry. The slurry then flows from the pug mill into a spreader box which travels just behind the slurry-mixing truck. The slurry then is spread from the spreader box onto the underlying paved surface.

Fillers, such as polymer fiber, paper or rubber particles (e.g., crumb rubber obtained from recycled vehicle tires) may also be contained in the slurry seal. Slurry seals that contain crumb rubber are often referred to as "rubberized" slurry seals. They differ from the above-described rubber modified asphalt or rubber asphalt cement in that the rubber particles are not incorporated into the asphalt prior to its emulsification, but rather are combined with the aqueous asphalt emulsion and other components to form an asphalt emulsion mixture which contains solid rubber particles. For example, U.S. Pat. No. 5,539,029 (Burris) and U.S. Pat. No. 5,811,477 (Burris, et. al.) describe asphalt emulsion mixtures that contain solid rubber particles as well as certain slurry seal compositions that are prepared by mixing such solid rubber particle-containing asphalt emulsion mixture with aggregate. In applications such as the above-described "truck mixed" application where it is necessary for the asphalt emulsion mixture to be passed through a pump, the inclusion of solid rubber particles (or other solid fillers such as polymer fibers, clay, etc.) can be problematic in that the rubber particles or filler particles can form clumps and can cause clogging of the pump, especially when the asphalt emulsion mixture is allowed to cool to ambient temperatures below about 55° F. Also, the inclusion of solid rubber particles (or other solid fillers such as polymer fibers, clay, etc.) in the aqueous asphalt emulsion mixture can cause increased wear to pumps, thereby requiring frequent replacement or rebuilding of the pumps.

Also, the inclusion of solid rubber particles in slurry seals can be problematic after the slurry seal has been applied. For example, in some applications the rubber particles may separate or "ravel" from the slurry seal coat.

Some of the problems of the prior art have been overcome by the prior invention of a liquid, non-thixotropic aqueous asphalt emulsion which combines the break-down products of recycled tire rubber with hot asphalt to form a rubber modified asphalt product that is substantially liquid and which contains little or no (e.g., less than 2% by weight) solid particulate rubber, as described in pending U.S. Pat. No. 6,894,092 (Sylvester, et al.) entitled "Aqueous Asphalt Emulsions Containing Liquefied or Devulcanized Recycled Rubber." The present invention provides certain improvements and additions to the invention described in U.S. Pat. No. 6,894,092, including certain formulations and manufacturing processes whereby cationic, quick setting versions of such Aqueous Asphalt Emulsions Containing Liquefied or Devulcanized Recycled Rubber may be made. The quick setting asphalt emulsions of this invention are useable in numerous applications, including coating, roofing, seal coating, slurry sealing, micro-surfacing and other paving, coating or pavement maintenance applications where it is desirable for the asphalt emulsion, or a composition containing the asphalt emulsion, to set in a relatively short period of time.

SUMMARY OF THE INVENTION

In accordance with the present invention, emulsions of DDBSA-treated rubber modified asphalt cement (RMAC) are prepared. These emulsions are preferably non-thixotropic. First, a RMAC is prepared by combining 45 to 90% by weight asphalt with about 5% to about 55% by weight solid recycled rubber under conditions that cause at least a substantial portion of the solid rubber to become liquified or otherwise incorporated into the asphalt. The RMAC may be prepared by the method described in U.S. Pat. No. 5,492,561 (Flanigan), which is expressly incorporated herein by reference (commercially available as MAC-10-TR from Paramount Petroleum Co., Inc., Paramount, Calif.). Preferably, the resultant RMAC contains no more than about 2% by weight, and preferably substantially no, residual solid rubber. Preferably, the solid rubber is not swelled or mixed with solvent prior to its incorporation into the asphalt. Thereafter, the RMAC is pre-treated by mixing the RMAC with dodecyl benzenesulfonic acid (DDBSA) available commercially from Pilot Chemical, Inc., Santa Fe Springs, Calif. A bubbling reaction occurs following the mixing of the RMAC with the DDBSA and the viscosity of the resultant DDBSA-Treated RMAC (DTRMAC) is lower than the viscosity of the RMAC prior to its reaction/modification with the DDBSA. This decrease in viscosity facilitates subsequent emulsification of the DTRMAC. Such emulsification may be carried out by preparing an aqueous emulsification solution which contains water, an acid and an organic amine having an functionality of 3 or higher (e.g., Tallow Tetramine available commercially as Redcote E-9A from Akzo Nobel Surface Chemistry, L.L.C., 8201 W. 47$^{th}$ St., McCook, Ill. 60525) and subsequently comilling that aqueous emulsification solution with the DTRMAC to form a cationic aqueous DMRMAC emulsion. Depending on the particular application for which the cationic aqueous DTRMAC emulsion is to be used, various other ingredients may also be added to the emulsion or to the emulsification solution or DTRMAC prior to the comilling. Such optional other ingredients include but are not necessarily limited to polymer latex, thickener, pH adjuster, pH stabilizer, surfactant, antifoam agent, colorant, pigment, carbon black, filler, etc.). In instances where one or more of the optional ingredients is not water soluble, such may be suspended or carried in the emulsification solution such that an emulsification solution with suspended solid matter is formed. However, in many applications it is desirable that the DTRMAC emulsions of this invention be prepared without solid matter or solid components (e.g., bentonite clay, etc.) thereby avoiding limitations and problems associated with the use of asphalt emulsions which contain substantial amounts of solid material. The DTRMAC emulsions of this invention may contain substantially more asphalt solids (e.g., 72% by weight as opposed to 52% by weight) than RMAC emulsions prepared using RMAC that has not been pre-treated with DDBSA.

Further in accordance with this invention, cationic aqueous DTRMAC emulsions of the foregoing character may be combined with dense graded aggregate, preferably Type I, II or III aggregate, to form a paving compositions such as a slurry seal compositions. Paving compositions made with the DTRMAC emulsions of this invention will avoid the problems that can be associated with paving compositions that contain substantial amounts of solid particulate rubber, while still complying with state and/or Federal guidelines or incentives calling for use of substantial amounts of recycled tire rubber in paving compositions. Additionally, the cationic paving compositions of the present invention will set rapidly and, at least some instances, may be substantially set and ready for traffic within 45 minutes to 1½ hour. Also, the DTRMAC emulsions of this invention are capable of adequately incorporating substantially more aggregate than emulsion made of RMAC that has not been subjected to DDBSA treatment prior to emulsification.

Still further in accordance with this invention, DTRMAC emulsions of the foregoing character may be combined with polymers, pigments, paints, metal powders or other components to provide compositions useable for many applications wherein asphalt emulsions have typically been used, including but not limited to paving, roofing, flooring, truck bed lining, coating of surfaces, lining of cargo holds on ships or barges, seal coats, crack fillers, etc.

Further aspects and advantages of this invention will be discerned by those of skill in the art upon reading and understanding of the following detailed description and the accompanying drawings and figures.

DETAILED DESCRIPTION AND EXAMPLES

The following detailed description, and the accompanying drawings to which it refers, are provided describing and illustrating certain examples or specific embodiments of the invention only and not for the purpose of exhaustively describing all possible embodiments and examples of the invention. Thus, this detailed description does not in any way limit the scope of the inventions claimed in this patent application or in any patent(s) issuing form this or any related application.

A presently preferred cationic DTRMAC emulsion of the present invention may be prepared according to the following formulation and process:

A. Preparation of the RMAC

The RMAC may be purchased commercially or may be prepared by blending solid rubber particles, preferably those which will pass through a number 20 U.S. series sieve or smaller, with asphalt at temperatures in excess of 350 degrees F. The asphalt may be pretreated with rosin acids and/or tall oil derivatives such as Westvaco CTO (crude tall oil available from Mead-Westvaco Corporation, Specialty Chemicals Division, Polychemicals Dept., P.O. Box 11805 Charleston, NC 29423-8005) or Westvaco M-28B (distilled tall oil fatty acids available from Mead-Westvaco Corporation, Specialty Chemicals Division, Polychemicals Dept., P.O. Box 11805 Charleston, NC 29423-8005. The rubber particles become substantially reduced to liquid and become combined with the asphalt. Covalent bonds are formed between the certain molecular components of the asphalt and sulfur/rubber rosin which results from the melting or break-down of the rubber.

Alternatively, as described above, the RMAC may be a product known as MAC10-TR which is available commercially from Paramount Chemical Company, Inc. of Paramount, Calif. MAC-10TR is a rubber modified asphalt cement manufactured by the TRMACS process described and claimed in U.S. Pat. No. 5,492,561 (Flanigan) entitled ""Process for Liquefying Tire Rubber and Product Thereof," which is expressly incorporated herein by reference. In this TRMACS process, crumb rubber and asphalt are heated to high temperatures (e.g., temperatures of approximately 500° F.) under carefully controlled conditions, causing the crumb rubber to liquify. In this process, asphalt may be introduced into a reactor vessel and non-solvent-treated, non-pre-swelled, whole tire solid rubber particles may then be introduced into the asphalt to form a mixture of the asphalt and rubber particles within the reaction vessel. Part of such mixture may then be circulated from a middle portion of the reactor vessel to a bottom portion of the reactor vessel, through jet spray nozzles as described in U.S. Pat. No. 5,492,561 (Flanigan), until the tire rubber particles become fully incorporated into the asphalt, thereby forming the RMAC. During this process, the temperature of the mixture may be maintained sufficiently high to facilitate liquefaction or break-down and incorporation of the rubber into the asphalt. For example, a temperature of 500° F. may be used. In at least some instances, the rubber/asphalt mixture is circulated from the reactor vessel through a heat exchanger to increase temperature of the asphalt medium to about 500° F. Preferably, hydrogen sulfides and mercaptans evolve from the rubber as it undergoes this treatment and the large insoluble polymer molecules of the rubber break into smaller thermoplastic molecules. These thermoplastic molecules are then adsorbed onto the maltenes of the asphalt, providing a homogenous modified asphalt composition in which the rubber has been fully incorporated. The RMAC prepared by this process is substantially free of rubber particles, as substantially all of the recycled rubber is devulcanized and the thermoplastic product of such vulcanization reacts with the asphalt to form a new chemical entity. The properties of this preferred MAC10-TR are as follows:

| Content Derived From Recycled Tire Rubber (ASTM D2042) | 11% to 15% |
| Solubility in Trichloroethylene (ASTM D2042). | 97.5% (min.) |
| Penetration (ASTM D5) | |
| @ 4° C. | 20 dmm |
| @ 25° C. | 40 to 60 dmm |
| Dynamic Viscosity @ 60° C. (ASTM D2171) | 5000 poise (min.) |
| Kinematic Viscosity @ 135° C. (ASTM D2170) | 100 centistokes (max.) |
| Flash Point-Cleveland Open Cup (ASTM D92) | 232° C. |
| Softening Point (ASTM D36) | 53° C. (min) |

B. Preparation of the DTRMAC:

The DTRMAC is prepared by combining the RMAC (e.g., MAC-10-TR) with DDBSA. This may be accomplished by placing the RMAC at a temperature between about 238 degrees F. and about 375 degrees F., and preferably between about 300 degrees F. and bout 325 degrees F., into a tank that is equipped with a mixer. Thereafter, about 0.5 to about 5% by weight DDBSA, and preferably about 2% to about 4% by weight DDBSA, is added to the RMAC and mixed. A bubbling reaction is observed to occur following the addition of the DDBSA and the acid number and viscosity of the mixture falls as the mixing/reaction proceed. In the past, DDBSA had been added as a surfactant to the aqueous phase prior to emulsification with a RMAC, as described in U.S. Pat. No. 6,894,092 (Sylvester, et al.). Such addition of the DDBSA to the aqueous phase caused the DDBSA to saponify and, thus, the DDBSA was rendered non-acid and incapable of raising the acid number of the emulsion. In contrast, in the present invention, the DDBSA is added directly to the RMAC (non-aqueous phase) whereby the DDBSA reacts with some component(s) of the RMAC, resulting in a DTRMAC that has decreased viscosity and a higher acid number than the starting RMAC.

In this example, a batch of DTRMAC may be prepared by combining and reacting about 26,000 pounds of MAC-10-TR at about 325 degrees F. with about 520 pounds of room temperature DDBSA.

C. Preparation of Emulsifying Solution:

Tap water is placed in a tank equipped with a mixer and the water is heated to about 80–160 degrees F. and preferably to about 90–120 degrees F. About 5–7% by weight of 20% hydrochloric acid and about 6–8% by weight tallow tetramine (which may be preheated and melted) are added to the water and the mixture is agitated until substantially all of the tallow tetramine has been dissolved. Various other polyfunctional amine compounds, preferably having amine functionality in excess of three (e.g., tetramines, pentamines, hexamines, etc.) may be used in place of some or all of the tallow tetramine. Other cationic emulsifiers known to those of skill in the art may alternatively be used, for example MQK and MQK-1M (Mead-Westvaco Corporation, Charleston, N.C.), imadazolines such as Indulin QTS (Mead-Westvaco Corporation, Charleston, N.C.) and tallow diamines such as E-9 and 4819 (AKZO Nobel, McCook, Ill.). Also, other acids may be substituted for some or all of the preferred hydrochloric acid. In this example, a batch of the aqueous emulsifying solution may be prepared by combining about 16,426 pounds of water at 90–100 degrees F. with about 1300 pounds of 20% HCl and about 1368 pounds of tallow tetramine and mixing such combination while maintaining its temperature at about 90–120 degrees F. until the tallow tetramine is completely dissolved. The tallow tetramine is preferably in liquid form at the time it is added to the water, either due to pre-heating and melting at temperatures at or above about 140 degrees F. or due to pre-dissolution of the tallow tetramine in a suitable solvent.

Other components may optionally be included in the aqueous emulsifying solution. One of the optional components is polymer latex. Polymer latex may be included in some DTRMAC emulsions intended for applications wherein enhanced adhesion, water resistance or other physical properties are desired, such as certain paving applications, roofing applications and other applications. Such polymer latex will typically comprise a rubber or elastomeric latex in which globules of rubber or elastomer are suspended in an aqueous medium. The preferred polymer latex is styrene-butadiene rubber latex or "SBR latex" such as those commercially available as NS175 (BASF Corporation, Mount olive, N.J.), Petrolatex S62 (Petroflex Industria Commercio S/S, Duque de Caxias, RJ Brazil) and/or an acrylic copolymer such as Rayvace 475 (Specialty polymers, Woodburn, Oreg.). Other rubbers or elastomers that have been purportedly useable in these polymer latexes include neoprene and natural rubber, acrylics, vinylacrylics, acrylic terpolymers, nitrile, polyvinyl alcohol, polyvinyl acetate, vinyl acetate-ethylene, vinyl ester copolymers, ethylene vinyl chloride, polyvinylidene chloride, butyl rubber, acrylonitrile-butadiene, polyurethanes, silicones, and block copolymers such as styrene-isoprene (SIS), styrene-ethylene-vinyl acetate (SEVAS) and styrene acrylate. It will be understood by those of skill in the art hat the polymer latex need not necessarily be included in the emulsification solution before the emulsification step. Rather, in some instances, some or all of the desired polymer latex may be post added to the DTRMAC emulsion after the emulsion has been prepared.

Other optional components of the DTRMAC emulsion are surfactants. Many surfactants useable in asphalt emulsions are well known in the art. Examples of surfactants that may be used in the cationic emulsions of the present invention include Surfynol 104A (Air Products Corporation).

Other optional components of the DTRMAC emulsion are thickeners including but not limited to associative thickeners, polyurethanes, nonionic surfactants, alkali swellable latex thickeners (SB Copolymer Latex, Tychem 68710, Reichold Chemical Corp., White Plains, N.Y), cellulose, cellulose derivatives, modified cellulose products, plant and vegetable gums, starches, clays, alkyl amines, polyacrylic resins, carboxyvinyl resins, polyethylene maleic anhydrides, polysaccharides, acrylic copolymers (e.g., R2E146, Specialty Polymers Co., Woodburn, Oreg.) and others known in the art. Portland cement and/or hydrated lime may also be used as thickeners in some of the cationic DTRMAC emulsions of the present invention.

Another optional component of the RMAC emulsion is an anti-foam agent. If needed, an antifoam (e.g., Dow Anti-Foam 1400 or Dow Anti-Foam Component A available from Dow Chemical Company, Midland, Mich.) may be added to the emulsification solution or may be post added to the RMAC emulsion. Typically, about 0.0025–0.05% by weight of the anti-foam agent may be included in the emulsification solution.

Preparation of DTRMAC Emulsion:

The DTRMAC heated to, or has been maintained at about 238° F. to about 375° F. (preferably about 310–350° F.).

Such heated DTRMAC is then combined with the above described aqueous emulsifying solution that has been preheated to or maintained at approximately 80–160° F. and mixed or milled so as to shear the DTRMAC into droplets and to form the desired DTRMAC emulsion. Because of the lowered viscosity of the DTRMAC as compared to RMAC, this emulsification process can be carried out by comilling the DTRMAC (at least 300 degrees F.) and the aqueous emulsification solution (about 90–120 degrees F.) in a colloid mill. One commercially available colloid mill useable for this process is the Charlotte G-75 available from Chemicolloid Laboratories, Inc., Garden City park, N.Y. It is preferable that the temperature of the emulsion exiting the colloid mill be less than 212 degrees F. so as to avoid flash-off of the aqueous phase. In present experience, the temperature of the DTRMAC emulsion exiting the colloid mill is approximately 192 degrees F. when the temperature of the DTRMAC entering the mill is about 325 degrees F. and the temperature of the aqueous emulsifying solution entering the colloid mill is about 100 degrees F. Alternatively, if the temperature of the DTRMAC emulsion exiting the colloid mill is in excess of 212 degrees F., a heat exchanger may be attached to the outlet end of the mill and used to cool the DTRMAC emulsion as it exits the mill.

Preparation of Slurry Seals From DTRMAC Emulsion:

In addition to many other types of products in which the DTRMAC emulsion may be incorporated, such DTRMAC emulsion may be combined with aggregate (e.g, fines, Type I, II or III) to form a slurry seal composition for application to roads, parking lots and other paved surfaces. Preferably, when the cationic DTRMAC emulsions of the present invention are used, a Type I, II or III aggregate will be used. For example, when a DTRMAC emulsion of the above general formulation are used, approximately 35–75 pounds per gallon of aggregate may be mixed with the DTRMAC emulsion in either a central mix process or a truck mixed process. In the central mix process, the DTRMAC emulsion and the aggregate are combined in a blend tank or vessel and a mixer is used to create a homogenous suspension of the aggregate in the DTRMAC emulsion. In the truck mixed process, the emulsion mixture and the aggregate are pumped or metered into a truck mounted mixing apparatus known as a "pug mill" where the DTRMAC emulsion and the aggregate become combined in a homogenous slurry. Such slurry then flows from the pug mill into a spreader box which travels just behind the slurry-mixing truck. The slurry then is spread from the spreader box onto the underlying paved surface.

In slurry seal applications and/or other product applications wherein the DTRMAC emulsion of the present invention is a component, various other components or additives may be used in accordance with the known formulation techniques for such products. For example, in slurry seal applications, additional water inorganic salts and/or other additives (e.g., Portland cement, calcium carbonate, aluminum sulfate, lime, etc.) Other fillers, such as polymer fiber, paper or rubber particles may also be contained in the slurry seal. Examples of additives that may be included in slurry seals of this invention are described in U.S. Pat. No. 5,539,029 (Burris) and U.S. Pat. No. 5,811,477 (Burris, et. al.), which are expressly incorporated herein by reference.

Although exemplary embodiments of the invention and specific examples have been described, various changes, modifications and substitutions may be made by those having ordinary skill in the art without necessarily departing from the spirit and scope of this invention. Specifically, elements or attributes described in connection with one embodiment or example may also be used in connection with any another embodiment or example provided that the inclusion or use of such element or attribute would not render the embodiment or example in which it is incorporated unuseable or otherwise undesirable for an intended application. Accordingly, all such changes, modifications and substitutions to the above-described embodiments and examples are to be included within the scope of the following claims.

What is claimed is:

1. A method for preparing an aqueous emulsion of pretreated rubber modified asphalt cement, said method comprising the steps of:
   A. preparing a rubber modified asphalt cement by combining 45 to 90% by weight asphalt with about 5% to about 55 % by weight solid rubber particles under conditions that cause at least a substantial portion of the solid rubber to become liquified so that the resultant rubber modified asphalt contains no more than about 2% by weight residual solid rubber;
   B. combining the rubber modified asphalt cement form Step A with dodecyl benzenesulfonic acid to form a pretreated rubber modified asphalt cement; and,
   C. mixing the pretreated rubber modified asphalt cement with water, an acid and a polyfunctional amine compound that has an amine functionality of at least 3, to form an aqueous emulsion.

2. A method according to claim 1 wherein said conditions in Step A comprise heating to a temperature in excess of about 350° F.

3. A method according to claim 1 wherein said conditions in Step A comprise heating to about 500° F.

4. A method according to claim 1 wherein the rubber modified asphalt cement is prepared in Step A by a process wherein crumb rubber and asphalt are heated under conditions and to a temperature that causes the crumb rubber to liquify.

5. A method according to claim 1 wherein Step A further comprises i) combining the asphalt and solid rubber particles in a vessel, ii) circulating at least a portion of the asphalt and rubber particle mixture from a middle portion of the vessel into a bottom portion of the vessel through jet spray nozzles.

6. A method according to claim 1 wherein Step B comprises mixing the rubber modified asphalt cement with about 0.5% to about 5%, or preferably about 2% to about 4% by weight dodecyl benzenesulfonic acid such that a chemical reaction occurs.

7. A method according to claim 1 wherein Step C comprises preparing an aqueous emulsifying solution which contains water, acid and the polyfunctional amine compound having an amine functionality of at least 3 and subsequently mixing that emulsifying solution with the pre-treated rubber modified asphalt cement prepared in Step A so as to shear the pre-treated rubber modified asphalt cement into droplets and creating the desired emulsion.

8. A method according to claim 1 wherein the solid rubber particles used in Step A are non-swelled.

9. A method according to claim 1 wherein the solid rubber particles used in Step A have not been dispersed in or mixed with a solvent.

10. A method according to claim 1 wherein Step C comprises passing the pre-treated rubber modified asphalt cement, water, acid and polyfunctional amine compound through a colloid mill to form the emulsion.

11. A method according to claim 1 wherein the pre-treated rubber modified asphalt cement droplets in the emulsion are about 2–40 microns in diameter.

12. A method according to claim 1 wherein at the beginning of Step C the temperature of the pre-treated rubber modified asphalt cement is about 238–375° F. and the temperature of the water is about 80–160° F.

13. A method according to claim 7 wherein at the beginning of Step C the temperature of the pre-treated rubber modified asphalt cement is about 238–375° F. and the temperature of the aqueous emulsifying solution is about 80–160° F.

14. An aqueous emulsion of pre-treated rubber modified asphalt cement prepared by the method of any of claims 1–13.

15. A paving composition comprising an aqueous emulsion of pre-treated rubber modified asphalt cement according to claim 14 mixed with a quantity of aggregate.

16. A paving composition according to claim 15 containing approximately 35–80 pounds of aggregate per gallon of emulsion.

17. A paving composition according to claim 16 wherein the aggregate is Type I, II or III.

18. A method according to claim 1 above wherein Step A comprises chemically treating the rubber to cause devulcanization thereof and/or otherwise devulcanizing the rubber and subsequently mixing the chemically treated and/or otherwise devulcanized rubber with asphalt at temperatures above about 238 degrees F.

19. A method according to claim 1 wherein Step B comprises mixing the rubber modified asphalt cement with about 2% to about 4% by weight dodecyl benzenesulfonic acid such that a chemical reaction occurs.

20. A method according to claim 1 wherein the pre-treated rubber modified asphalt cement droplets in the emulsion are about 2 to 20 microns in diameter.

* * * * *